March 21, 1939.        L. J. RAUCH ET AL        2,150,986
HOSE CLAMP
Filed April 14, 1938
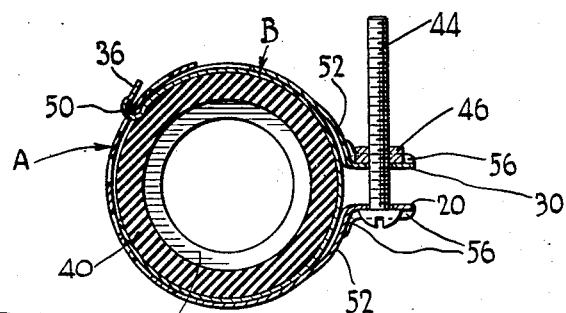
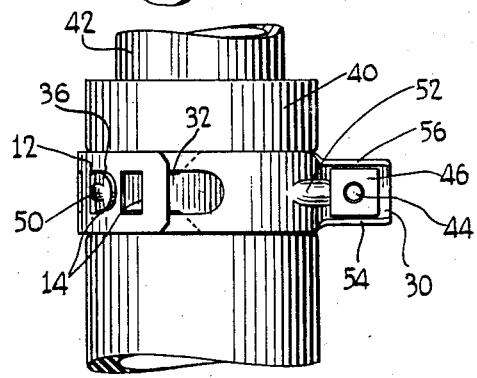
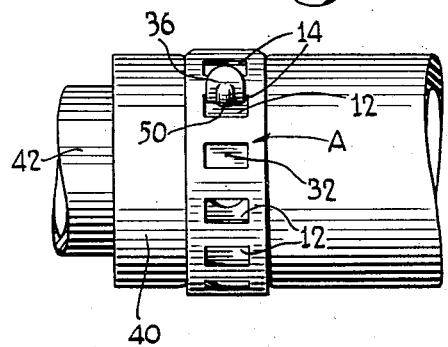
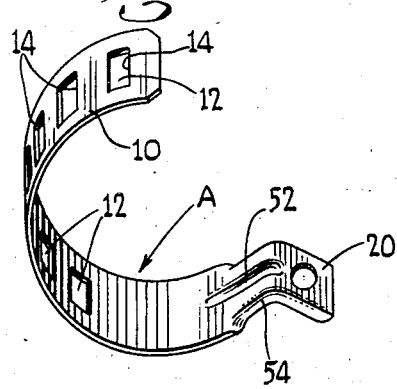
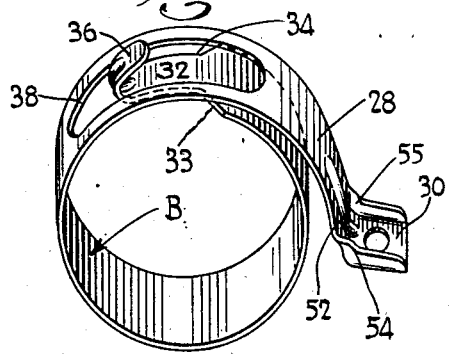
INVENTORS
LOUIS J. RAUCH
PHILIP RAUCH
BY
ATTORNEYS Patented Mar. 21, 1939

2,150,986

UNITED STATES PATENT OFFICE 2,150,986

HOSE CLAMP

Louis J. Rauch and Philip Rauch,
Brooklyn, N. Y.

Application April 14, 1938, Serial No. 201,858

4 Claims. (Cl. 24—19)

This invention relates to hose clamps.

An object of the invention is to provide an improved clamp construction comprising two separate bands which are adjustable for use on hose or similar objects of different sizes by the interengagement of an element on one part with cooperating elements on the other, and which may be clamped tightly around a hose of appropriate size in any of its adjustments by drawing together free ends of its respective parts. A special feature of our improved construction lies in its ability to withstand severe tightening without bending of breaking under the stresses thus imposed upon the adjusting and tightening elements, even when the clamp is made of light, inexpensive metal stock.

An illustrative embodiment of the invention is shown in the accompanying drawing, in which Figure 1 is a cross section through the improved hose clamp as tightened around a hose in use.

Figure 2 shows a hose end assembled on the end of a pipe and fastened in place by means of the improved hose clamp.

Figures 3 and 4, respectively, are perspective views of different parts of the clamp, and Figure 5 is a side view of the assembly shown in Figure 2.

The illustrated hose clamp comprises two principal cooperating parts, A and B, the general construction of which is indicated quite clearly in Figures 3 and 4, respectively. As shown in Figure 3, part A comprises a band of sheet metal having a shank portion 10 and an apertured lug 20 at one end extending at an angle with respect to the band. The shank portion 10 is formed with a series of spaced apertures 12 providing a series of spaced ledges 14 for cooperation with an element of part B.

Part B of the clamp, as shown in Figure 4, also consists of a unitary band which is made from sheet metal of the same type and gauge as part A. It is much longer than part A and is formed to encircle a hose completely with an end portion 28 extending in overlapping relation to part of the band when the clamp is assembled in use. One end of B is formed as a lug 30 substantially identical with lug 20 of part A, which will be described more particularly below. A portion 32 of the band adjacent the other end is reduced in width as at 33 and 34 and this reduced portion terminates in an outwardly and backwardly directed hook 36 of a size adapted to extend through the apertures 12 of part A, and to engage any one of the ledges 14. Between hook 36 and lug 30, and nearer the latter, an elongated slot is cut out of the band, as indicated at 38, this slot being of a width sufficient to permit free movement of the aforesaid reduced end portion therein, with the hook 36 extending through the slot to the periphery of the band when part B is curved in condition for use, substantially as illustrated in Figure 4.

The assembly of parts A and B in the use of the clamp is illustrated in Figures 1, 2 and 5, which show a hose end 40 fastened on a pipe end 42 by means of the assembled parts. Each of the parts is normally curved approximately as shown, to fit the contour of the hose. Part B is first opened and looped around the hose, encircling the same between the hooked end and slot 38 with hook 36 extending outwardly through the slot. Part A is then interlocked with part B by engaging one of its ledges 14 in hook 36 so that it extends around a side of the hose opposite the portion 28 of part B, with lug 20 in registering but spaced relation to lug 30. It is obvious that any of several ledges 14 may be chosen for interengagement with hook 36, depending upon the desired spacing of lugs 20 and 30, and that the clamp is adapted for use with equal facility on objects of different diameters. Upon arrangement of the two clamp pieces around the hose, a bolt 44 passing through the apertures of the lugs and a nut 46 may be used to draw the lugs 20 and 30 together and thus clamp the hose end 40 firmly on pipe end 42. It will be understood, of course, that the clamp parts may be assembled loosely and then slipped over the end of the hose or other object wherever circumstances permit.

Severe limitations are imposed on the practical construction of a device of this type, which must be overcome in order to provide the most advantageous structure. In the first place, the cost of the clamp must be kept low, which requires the use of inexpensive materials and of few and simple manufacturing operations. In the second place, the clamp should possess more than adequate clamping strength and resistance to bending or breakage under the stress encountered in use, yet these parts must be flexible to permit easy adjustment and easy assembly in clamping position. The improved hose clamp construction provided by this invention is especially suited to meet these exacting requirements.

It will be noted that the assembly of part B around a hose, as well as the engagement of hook 36 with different members of the series of ledges 14 and the subsequent drawing together of parts A and B around hose of different sizes, require flexure of the bands forming the clamp parts so that they will closely and uniformly hug the hose. This is made possible by making the bands of ductile metal stock having a thickness, for example, in the order of $\frac{1}{32}$ of an inch. Economy of manufacture requires that the entire clamp be made of this same material. In the use of the clamp, however, strong forces are exerted on the hook 36 tending to bend it back into line with the band, and the angularly disposed lugs 20 and 30 similarly are subject to bending tension which must be resisted in order for the clamp to perform satisfactorily.

To meet these problems, we deform the metal adjacent the bends of hook 36 and lugs 20 and 30 so that its rigidity and resistance to bending and breaking are greatly increased. Thus the metal adjacent the bend of hook 36 is formed with a central longitudinal rib 50 which is pressed from the plane of the band and has the same effect on its strength as would be imparted by a considerable increase in thickness or by affixing a reenforcing element of stronger material.

The metal adjacent the bend of each of lugs 20 and 30 also is formed with a central longitudinal rib, indicated at 52, which is pressed out of the plane of the strip and preferably extends around and to points on both sides of the bend. In addition, longitudinal side flanges 54 and 56, extending at an angle to the metal of the respective parts, are provided on each lug and around the bends thereof by deforming side margins of the metal outwardly into a plane extending at an angle, preferably at approximately 90°, with respect to the parts. These features together impart great rigidity to the otherwise pliable metal in the zone of the lugs, and causes each lug to remain in fixed angular relation to the body of its respective part so that strong pulling action at right angles to the planes of the lugs may be exerted by turning screw 44 without danger of bending or breaking off the lugs when the tension on the clamp reaches its maximum point.

As indicated in Figure 2, the side flanges 54 and 56 on each lug conveniently may be spaced apart so as to form a closely fitting enclosure for the nut 46. In this way the nut of the tightening elements may be placed in either lug and held securely against rotation while the bolt 44 is turned to clamp the device tightly in place.

We understand that deviations from the illustrated construction may be made without departing from the essentials of the invention, which should be accorded a scope commensurate with the requirements of the claims.

We claim:

1. A clamp for fastening hose or the like comprising two cooperating bands each formed of bendable sheet material and each having an integral tightening lug on one end extending at an angle to the respective band, one of said bands being of a length insufficient to encircle the hose and having a series of longitudinally spaced integral ledges extending from a point adjacent its other end over a substantial part of its length, the other of said bands being of a length to encircle a hose completely and overlap itself when in position thereon and having its other end reduced in width and turned backwardly to form an integral hook, said other band having an elongated slot intermediate its ends in such position and of such length as to permit said hook to be passed therethrough and engaged with a ledge on said one band when the portion of said other band between said slot and hook encircles hose of different sizes, and means integral with said bands extending longitudinally and disposed substantially centrally with respect to the bends of said lugs and hook rendering the same rigid and resistant to bending under strains encountered in clamping the parts in place.

2. A clamp for fastening hose or the like comprising two cooperating bands each formed of bendable sheet metal of similar gauge and each having an integral tightening lug on one end extending at an angle to the respective band, one of said bands being of a length insufficient to encircle the hose and having at least one aperture adjacent its other end providing an integral ledge facing toward its lug, the other of said bands being of a length to encircle the hose completely and overlap itself when in position thereon and having its other end reduced in width and turned backwardly to form an integral hook, said other band having a longitudinal slot intermediate its ends in such position and of such length as to permit said hook to be passed therethrough, engaged with said ledge and moved relative to the slot when the portion between said slot and hook encircles a hose, and means integral with said bands extending longitudinally and disposed substantially centrally with respect to the bends of said lugs and hook, respectively, rendering the same rigid and resistant to bending under strains encountered in clamping the parts in place.

3. In a multiple-part hose clamp adapted to encircle a hose twice when clamped thereon in use, a clamp part comprising an elongated band made of easily bendable sheet metal, one end of said band consisting of an integral, apertured tightening lug extending at an angle to its body, the other end being reduced in width and terminating in a backwardly-bent hook, said band being of a length greater than the circumference of the hose and having a longitudinal slot intermediate its ends but nearer said lug, and means integral with said band adjacent the bend of said hook rendering the same rigid and resistant to bending or breaking under strains encountered in clamping the part on a hose, said means comprising a longitudinal rib pressed out of the plane of the band around said bend and substantially centrally with respect to said band.

4. A clamp for fastening hose or the like comprising two cooperating bands each formed of bendable sheet metal of similar gauge and each having an integral tightening lug on one end extending at an angle to the respective band, one of said bands being of a length insufficient to encircle the hose and having at least one aperture adjacent its other end providing an integral ledge facing toward its lug, the other of said bands being of a length to encircle the hose completely and overlap itself when in position thereon and having its other end reduced in width and turned backwardly to form an integral hook, said other band having a longitudinal slot intermediate its ends in such position and of such length as to permit said hook to be passed therethrough, engaged with said ledge and moved relative to the slot when the portion between said slot and hook encircles a hose, the metal of said other band adjacent said hook and of both bands adjacent said lugs having centrally disposed longitudinal ribs pressed out of its normal plane and extending around and to both sides of the bands of said hook and lugs, respectively, each of said lugs having spaced longitudinal flanges extending at an angle to the same side of each lug and around the bend thereof, said lugs having registering apertures therein to receive a tightening bolt, and said flanges being spaced apart to enclose and prevent rotation of a nut for said bolt.

LOUIS J. RAUCH.
PHILIP RAUCH.